Nov. 3, 1964    T. A. MIDDLESWORTH ETAL    3,155,083
LOW SILHOUETTE ENGINE
Filed Oct. 4, 1962                2 Sheets-Sheet 1
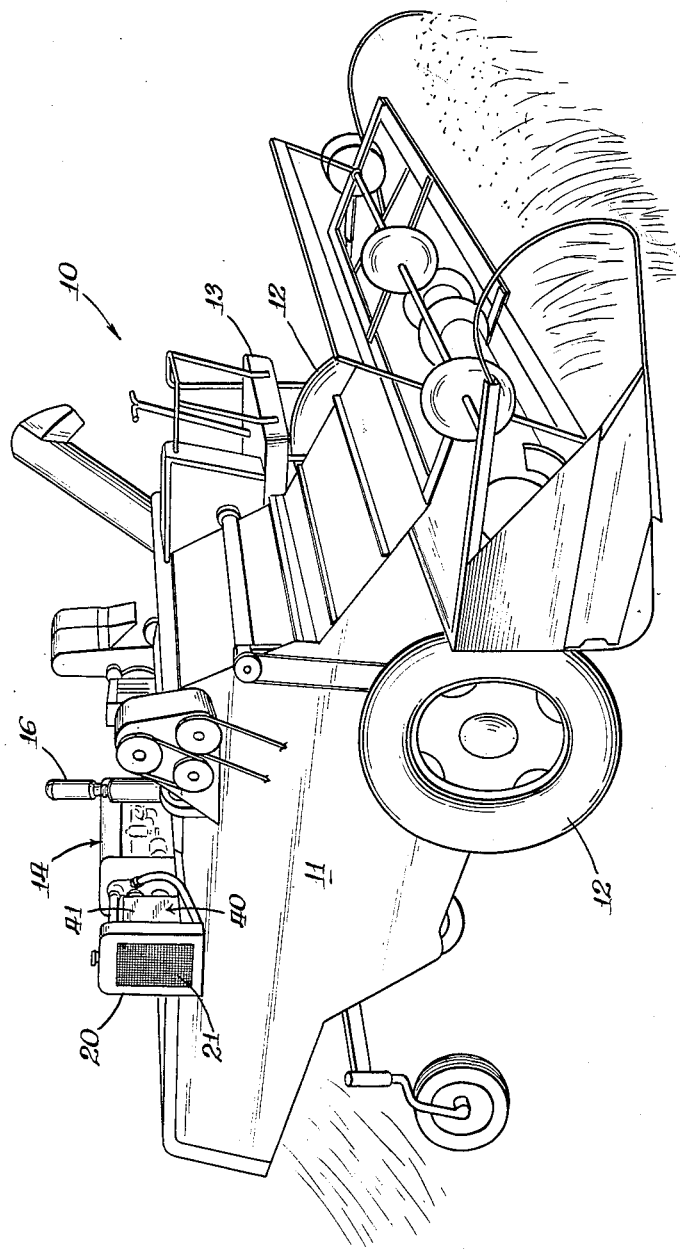
INVENTORS.
Tommy A. Middlesworth
Wendell E. Dorsett
By:

Nov. 3, 1964  T. A. MIDDLESWORTH ETAL  3,155,083
LOW SILHOUETTE ENGINE
Filed Oct. 4, 1962  2 Sheets-Sheet 2
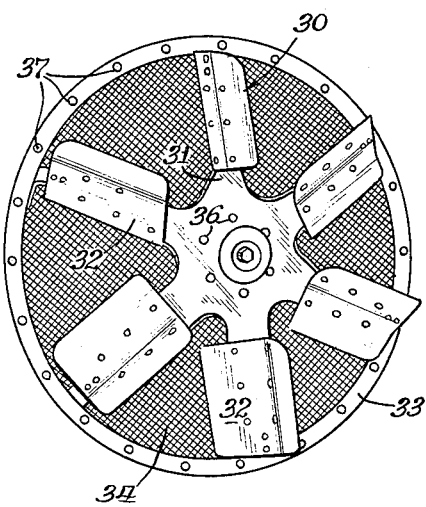
INVENTORS.
Tommy A. Middlesworth
Wendell E. Dorsett 3,155,083
LOW SILHOUETTE ENGINE
Tommy A. Middlesworth, Hinsdale, Ill., and Wendell E. Dorsett, Albany, Ga., assignors to International Harvester Company, Chicago, Ill., a corporation of New Jersey
Filed Oct. 4, 1962, Ser. No. 228,494
6 Claims. (Cl. 123—41.49)

The present invention relates generally to improvements in combines and more particularly to a new and improved low silhouette combine wherein the engine's cooling system does not extend above the engine.

In the construction of combines it has been a general practice to mount the engine upon the upper surface of the combine body. In this position the engine does not interfere with the material-handling mechanisms of the combine, is easily accessible, and is exposed to the air which contributes to the cooling of said engine. Although this arrangement has been very satisfactory, it adds considerable height to the combine. Difficulties are often encountered when storing the combine in a garage or barn or when transporting the combine on the bed of a truck and a low bridge or trestle is encountered. Also the operator's visibility is hindered and the center of gravity of the combine is raised. In practice, it has been found that a great number of these difficulties could be overcome by reducing the height of the combine by several inches. The uppermost portion of a combine silhouette is the engine radiator which extends on the average 6 to 12 inches above the height of the engine. Reference may be had to U.S. Patent to Lindgren et al. No. 2,224,970 which discloses a combine having a motor and cooling system of the type referred to above.

The general purpose of this invention is to provide a combine which embraces all the advantages of similarly employed combines and possesses none of the aforedescribed disadvantages. To attain this the present invention contemplates a unique cooling system arrangement for the combine engine in which the combine engine does not extend above the level of the engine.

An object of the present invention is the provision of a low silhouette self-propelled combine.

Another object is to provide a cooling system for the engine of a self-propelled combine that does not increase the height of the combine.

Still another object is to provide a cooling system for a low silhouette combine that filters the air being blown over the radiator core.

These and other objects of the invention will become more apparent from the specification and drawings wherein:

FIGURE 1 illustrates a perspective view of a combine having the low silhouette engine mounted thereon;

FIGURE 2 illustrates a side elevation of a low silhouette engine shown in FIGURE 1;

FIGURE 3 illustrates a perspective view of the rotary fan and screen, and

FIGURE 4 illustrates a perspective view of the radiator shroud and baffle plate.

Referring now to the drawings, wherein like reference characters designate like or corresponding parts throughout the several views, there is shown in FIGURE 1 a combine generally designated 10 having a body 11, wheels 12, an operator's platform 13 and an engine 14. The engine 14 of the combine shown in FIGURE 1 is provided with a radiator 20, the top of which does not extend above the upper level of the motor or engine. The engine 14 is also provided with an upwardly extending air filter 16, however, this element can be readily removed when storing or transporting the combine.

Referring now to FIGURE 2 for a discussion of the engine cooling system, the engine, as located on the combine in FIGURE 1, is positioned with its longitudinal axis normal to the path of the combine. In such a position the crankshaft 15 of the engine is also normal to the direction of movement of the combine, it should be noted however that such a location of the engine with respect to the combine is for purpose of illustration only and the invention is not intended to be so limited. A conventional radiator 20 having a core 21 is located with respect to the engine a substantial distance away from the engine in the direction of the crankshaft. The fan 30 and the radiator shroud 40 are located within the space between the engine and the radiator.

Referring now to FIGURE 3 it will be seen that the rotating fan 30 and screen 34 are constructed as a unit and are mounted directly to the crankshaft 15 of the engine. The fan 30 comprises a hub 31 having an apertured plate 35 integral therewith through which it is secured to the crankshaft's apertured plate 17 by nuts and bolts 18. A plurality of fan blades 32 extend radially from said hub 31 and are connected at their outer ends to a ring 33. The circular screen 34 is secured to the hub 31 of the fan by a plurality of bolts 36 and to the ring 33 by a connector ring and a plurality of screws 37. The blades 32 of the fan are twisted to such an angle that the rotating fan will blow air from the motor towards the radiator core and the screen 34 is on the side of the fan which positions it between the fan and the engine such that the cooling air must pass through the screen before engaging the fan blades. The unit comprising both the rotating fan and screen functions as both a fan and an air cleaner. The blades 32 of the fan draws air towards the screen 34. Particles carried in the air even though they are of such a size that could pass through the mesh of the screen are deflected outwardly by contact with the rotating mesh thus permitting only clean filter air to be blown through the shroud and over the radiator core. This is necessary in a cooling system for an engine on a machine such as a combine because of the dust and other impurities present in the air which would clog the radiator core in a short time if allowed to be blown over it.

Referring now to FIGURE 4 the shroud 40 comprises a pair of sides 41, the top 42 having an offset portion 43, a bottom including an arcuate portion 44 and a back 45 having a circular opening 46 therein. A horizontally disposed baffle plate 47 joins said sides 41 and bisects said circular opening 46 about its diameter. As can be best seen in FIGURE 2 portions of the sides 41 and the offset portion 43 of the top overlie portions of the radiator and these overlapping portions are secured together as by bolts. This securement of the shroud to the radiator forms a duct extending rearwardly from the radiator core towards the engine and terminating in a circular opening 46 which is adapted to receive the rotating fan and screen. It has been found that the horizontal disposed baffle plate 47 effectively reduces radial air flow in the shroud and helps distribute the air in a more even pattern over the radiator core.

Thus it is seen that by mounting a blower type fan having a mesh screen secured thereto directly on the crankshaft of an engine and providing a baffled shroud between the fan and the radiator a cooling system for the engine is provided that filters the air before directing it over the radiator core and the radiator core can be mounted with respect to the engine such that it does not extend above the level of the engine.

It should be understood, of course, the foregoing disclosure relates only to a preferred embodiment of the invention and that numerous modifications and alterations may be made therein without departing from the spirit and scope of the invention as set forth in the appended claims.

What is claimed is:

1. An engine having a closed circuit fluid cooling system; an engine crankshaft extending outwardly from the engine; a circular blowing-type fan secured to said crankshaft; a circular screen co-extensive with and secured to said fan to rotate therewith; said cooling system including a radiator having a core; said radiator and engine being mounted with respect to each other such that they are spaced apart a substantial distance along the direction of the engine crankshaft; a shroud secured to said radiator and forming a closed duct between said fan and said radiator core, the free end of said duct having a circular opening, formed therein, dimensioned such that said rotating screen forms a cover for said opening.

2. The invention as set forth in claim 1 wherein said duct is provided with a horizontal baffle to reduce the radial air flow in said duct and to distribute the air evenly over the radiator core.

3. The invention as set forth in claim 1 wherein said screen is located such that it is between the fan and the engine.

4. A low silhouette engine comprising: an engine block having a longitudinal axis; an engine crankshaft extending outwardly from said engine block parallel to said longitudinal axis; a circular blowing-type fan secured to the outwardly extending portion of said crankshaft; a screen co-extensive with and secured to said fan to rotate therewith; a radiator having a core; said radiator and engine being mounted with respect to each other such that their upper edges are substantially even and they are spaced from each other along the longitudinal axis of said engine; a shroud secured to said radiator forming a closed duct extending from said radiator towards said engine, the free end of said shroud having a circular opening formed therein, said opening being located and dimensioned such that it is covered by said fan and screen so that the fan will blow air that has been filtered by the rotating screen through said duct and over said radiator core.

5. The invention as set forth in claim 4 wherein said duct is provided with a horizontal baffle to reduce the radial air flow in said duct and to distribute the air evenly over the radiator core.

6. The invention as set forth in claim 4 wherein said screen is located such that it is located between the fan and the engine.

References Cited in the file of this patent

UNITED STATES PATENTS

| | | |
|---|---|---|
| 1,511,513 | Fokker | Oct. 14, 1924 |
| 2,626,744 | Sanders | Jan. 27, 1953 |
| 2,896,595 | Guillo-Quevedo | July 28, 1959 |
| 3,006,125 | Claas | Oct. 31, 1961 |